United States Patent
Ye et al.

(10) Patent No.: US 11,054,917 B2
(45) Date of Patent: Jul. 6, 2021

(54) WEARABLE DEVICE AND CONTROL METHOD, AND SMART CONTROL SYSTEM

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Hongna Ye, Beijing (CN); Miao Liu, Beijing (CN); Bin Zou, Beijing (CN)

(73) Assignees: BEIJING BOE MULTIMEDIA TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/563,596

(22) PCT Filed: May 24, 2017

(86) PCT No.: PCT/CN2017/085722
§ 371 (c)(1),
(2) Date: Oct. 1, 2017

(87) PCT Pub. No.: WO2017/206777
PCT Pub. Date: Dec. 7, 2017

(65) Prior Publication Data
US 2019/0079598 A1    Mar. 14, 2019

(30) Foreign Application Priority Data
May 31, 2016    (CN) .......................... 201610378047.0

(51) Int. Cl.
G06F 3/0346    (2013.01)
G06F 1/16    (2006.01)
(Continued)

(52) U.S. Cl.
CPC ............ *G06F 3/0346* (2013.01); *G06F 1/163* (2013.01); *G06F 1/1694* (2013.01); *G06F 3/014* (2013.01);
(Continued)

(58) Field of Classification Search
None
See application file for complete search history.

(56) References Cited

U.S. PATENT DOCUMENTS 9,261,920 B2    2/2016    Wang et al.
2016/0018872 A1*    1/2016    Tu ........................ G06F 1/3234
                                                                    345/173
2017/0191835 A1    7/2017    Ou et al.

OTHER PUBLICATIONS

Zanchettin et al., "Kinematic motion analysis of the human arm during a manipulation task," ISR/Robotik 2010, pp. 1252-1257 (Year : 2010).*

(Continued)

*Primary Examiner* — Leslie J Evanisko
*Assistant Examiner* — Leo T Hinze
(74) *Attorney, Agent, or Firm* — Syncoda LLC; Feng Ma

(57) ABSTRACT

A method for controlling a wearable device is disclosed. The method includes a step of determining a wearing state of the wearable device based on a positional change of the wearable device. The wearable device can be an annular wearable device worn by surrounding a body part of a wearer, and primarily includes an operation control portion, which is configured to determine a wearing state of the wearable device on the wearer. The wearing state of the wearable device can include a wearing direction of the wearable device, and whether the wearable device is worn on the left arm or the right arm of the wearer. The wearable device can be controlled by certain movements of the wearer, and thus involves no operation interface. A smart control system is also disclosed.

7 Claims, 14 Drawing Sheets

S201: Determining whether the annular wearable device is worn on a left arm or a right arm of a wearer by detecting a relative positional change between the first direction, the second direction, and the third direction S202: Controlling an operation of the annular wearable device based on at least whether the annular wearable device is worn on the left arm or the right arm of the wearer

(51) Int. Cl.
    *G06F 3/01*     (2006.01)
    *G06F 3/038*    (2013.01)
    *G06K 9/00*     (2006.01)

(52) U.S. Cl.
    CPC ............ *G06F 3/017* (2013.01); *G06F 3/0383* (2013.01); *G06K 9/00375* (2013.01)

(56)            References Cited

OTHER PUBLICATIONS

International Search Report and Written Opinion dated Aug. 25, 2017 in PCT/CN2017/085722.
1st Office Action dated Apr. 18, 2018 in CN201610378047.0.

* cited by examiner

WEARABLE DEVICE AND CONTROL METHOD, AND SMART CONTROL SYSTEM

CROSS-REFERENCE TO RELATED APPLICATION

The present application claims priority to Chinese Patent Application No. 201610378047.0 filed on May 31, 2016, the disclosure of which is hereby incorporated by reference in its entirety.

TECHNICAL FIELD

The present disclosure relates generally to the technical field of wearable devices, and particularly relates to a control method of a wearable device, a control method thereof, and a smart control system.

BACKGROUND

Along with the spread of smart products, smart wristband wearable devices (such as watches, bracelets, etc.) have become more and more favored by consumers because they are convenient to carry. Many functions of existing wristband wearable devices need the user to operate on an operation interface (for example, smart wristband wearable devices generally have display interfaces/display panels).

However, the direction of the display panel is different when the wearing state is different. In existing wristband wearable devices, in order to be suitable for the wearer to view, the wearing state needs to be set manually. For example, depending on whether it is worn on the left arm or the right arm of the wearer, the wearing state needs to be reset manually so that the display direction of the display panel can be adjusted accordingly. As such, it is very inconvenient for the user.

SUMMARY

In view of the above, the present disclosure provides a wearable device, a controlling method thereof, and a smart control system.

In a first aspect, a method for controlling a wearable device is disclosed. The method includes a step of determining a wearing state of the wearable device based on a positional change thereof.

Herein the wearable device can be an annular wearable device, which can be worn by surrounding a body part of the wearer.

In some embodiments of the method, the step of determining a wearing state of the wearable device based on a positional change thereof includes the sub-step of determining the wearing state of the wearable device based on a relative positional change in a three dimensional space consisting of a first direction, a second direction, and a third direction.

Herein in the three dimensional space, the first direction can be parallel to an extending direction of the wearable device and is parallel to a surface of the wearable device, the second direction can be perpendicular to the first direction and is parallel to the surface of the wearable device, and the third direction can be perpendicular to the surface of the wearable device.

According to some embodiments of the method, the wearable device comprises a display panel, which is attached on the annular wearable device, and accordingly, the first direction can be along a tangent line of a display panel of the wearable device.

In some embodiments of the method, the determining the wearing state of the wearable device includes a sub-step of determining a wearing direction of the wearable device.

Herein the wearing direction of the wearable device can include a pointing direction of the second direction, and as such, the sub-step of determining a wearing direction of the wearable device includes:

detecting an acceleration value along the second direction upon detecting that the wearable device is swinging, and determining that the second direction is in a direction opposing to a fingertip if the acceleration value is positive, or is in a direction pointing to the fingertip if the acceleration value is negative.

In the embodiments of the method as described above, the detecting an acceleration value along the second direction is realized by means of a three-axis accelerometer.

In some embodiments of the method, the determining the wearing state of the wearable device further includes: determining whether the wearable device is worn on a left arm or a right arm of the wearer.

Herein the determining whether the wearable device is worn on a left arm or a right arm of the wearer can include the following sub-steps:

determining a first rotation direction of a first plane formed by the first direction and the third direction having the second direction as a rotation axis upon detecting that the first plane is rotating around the second direction, and a second rotation direction of a second plane formed by the first direction and the second direction having the third direction as a rotation axis upon detecting that the second plane is rotating around the third direction; and determining whether the wearable device is worn on the left arm or the right arm of the wearer based on the pointing direction of the second direction, the first rotation direction of the first plane, and the second rotation direction of the second plane.

In the embodiments of the method as described above, either one or both of the first rotation direction of the first plane and the second rotation direction of the second plane can be detected by a three-axis gyro sensor.

In the embodiments of the method as described above, the sub-step of determining a first rotation direction of a first plane formed by the first direction and the third direction having the second direction as a rotation axis upon detecting that the first plane is rotating around the second direction, and a second rotation direction of a second plane formed by the first direction and the second direction having the third direction as a rotation axis upon detecting that the second plane is rotating around the third direction includes the following sub-steps:

detecting a first rotation angle of the first plane and a second rotation angle of the second plane; and determining that the first rotation direction of the first plane is counter-clockwise if the first rotation angle is larger than a first preset positive value, or clockwise if the first rotation angle is smaller than a negative value of the first preset positive value; and the second rotation direction of the second plane is counter-clockwise if the second rotation angle is larger than a second preset positive value, or clockwise if the second rotation angle is smaller than a negative value of the second preset positive value.

In the embodiments of the method as described above, the sub-step of determining whether the wearable device is worn on the left arm or the right arm of the wearer based on the pointing direction of the second direction, the first rotation direction of the first plane, and the second rotation direction of the second plane includes the following sub-steps:

if the third direction is in a direction opposing to the wearer, determining:

that the wearable device is worn on the right arm of the wearer, if the second direction is in the direction pointing to the fingertip, the first rotation direction is clockwise, and the second rotation direction is counter-clockwise, or if the second direction is in the direction opposing to to the fingertip, the first rotation direction is counter-clockwise, and the second rotation direction is counter-clockwise; or that the wearable device is worn on the left arm of the wearer, if the second direction is in the direction pointing to the fingertip, the first rotation direction is counter-clockwise, and the second rotation direction is clockwise, or if the second direction is in the direction opposing to to the fingertip, the first rotation direction is clockwise, and the second rotation direction is clockwise;

or if the third direction is in a direction pointing to the wearer, determining:

that the wearable device is worn on the right arm of the wearer, if the second direction is in the direction pointing to the fingertip, the first rotation direction is clockwise, and the second rotation direction is clockwise, or if the second direction is in the direction opposing to to the fingertip, the first rotation direction is counter-clockwise and the second rotation direction is clockwise; or that the wearable device is worn on the left arm of the wearer, if the second direction is in the direction pointing to the fingertip, the first rotation direction is counter-clockwise, and the second rotation direction is counter-clockwise, or if the second direction is in the direction opposing to to the fingertip, the first rotation direction is clockwise, and the second rotation direction is counter-clockwise.

In some embodiments, the the sub-step of determining whether the wearable device is worn on the left arm or the right arm of the wearer based on the pointing direction of the second direction, the first rotation direction of the first plane, and the second rotation direction of the second plane can include the following sub-steps:

determining that the wearable device is worn on the right arm of the wearer if $Z_{xy}=1$ and $Y_0 \times Y_{xz}=-1$; or $Z_{xy}=-1$ and $Y_0 \times Y_{xz}=-1$; or that the wearable device is worn on the left arm of the wearer if $Z_{xy}=-1$ and $Y_0 \times Y_{xz}=1$; or $Z_{xy}=1$ and $Y_0 \times Y_{xz}=1$;

Herein the second direction $Y_0$ equals to 1 if in a direction pointing to the fingertip, or to $-1$ if in a direction opposing to the fingertip; the first rotation direction of the first plane Yxz equals to $-1$ if clockwise or to 1 if counter-clockwise; and the second rotation direction Zxy equals to $-1$ if clockwise or to 1 if counter-clockwise.

According to some embodiments, the method further includes a step of adjusting a display direction of a display panel of the wearable device according to the wearing state of the wearable device.

According to some other embodiments, the method further includes a step of controlling an operation of a second device according to the wearing state of the wearable device.

In a second aspect, the present disclosure further provides a wearable device worn on a wearer. The wearable device includes an operation control portion, which is configured to determine a wearing state of the wearable device on the wearer.

According to some embodiments of the present disclosure, the wearable device is an annular wearable device worn on an arm of the wearer, and accordingly, the operation control portion is configured to determine the wearing state of the wearable device on the wearer by detecting a relative positional change in a three dimensional space consisting of a first direction, a second direction, and a third direction.

Herein the first direction is parallel to an extending direction of the annular wearable device and is parallel to a surface of the annular wearable device; the second direction is perpendicular to the first direction and is parallel to the surface of the annular wearable device; and the third direction is perpendicular to the surface of the annular wearable device.

In some embodiments of the wearable device, the operation control portion includes a wearing state recognition sub-portion, which is configured to detect the relative positional change in the three dimensional space and to determine the wearing state based on the relative positional change.

In the embodiments of the wearable device as described above, the wearing state of the wearable device can include a wearing direction of the wearable device, which includes a pointing direction of the second direction, and the wearing state of the wearable device can also include whether the wearable device is worn on the left arm or the right arm of the wearer.

In the wearable device, the wearing state recognition sub-portion can include a second direction recognition circuit, an axis rotation direction recognition circuit, and a determining circuit.

The second direction recognition circuit is configured, upon detecting that the annular wearable device is swinging, to determine the pointing direction of the second direction.

The axis rotation direction recognition circuit is configured to determine a first rotation direction of a first plane formed by the first direction and the third direction having the second direction as a rotation axis upon detecting that the first plane is rotating around the second direction, and to determine a second rotation direction of a second plane formed by the first direction and the second direction having the third direction as the rotation axis upon detecting that the second plane is rotating around the third direction.

The determining circuit is configured to determine the wearing state of the wearable device based on the pointing direction of the second direction, the first rotation direction of the first plane, and the second rotation direction of the second plane.

In the wearable device as described above, the second direction recognition circuit can include a three-axis acceleration sensor and first determining sub-circuit.

The three-axis acceleration sensor is configured to detect an acceleration value along the second direction upon detecting that the annular wearable device is swinging, and the first determining sub-circuit is configured to determine the pointing direction of the second direction based on the acceleration value.

Herein the second direction is in a direction opposing to the fingertip if the acceleration value is positive, or the second direction is in a direction pointing to the fingertip if the acceleration value is negative.

In the wearable device, the axis rotation direction recognition circuit can include a three-axis gyro sensor, a second determining sub-circuit, and a third determining sub-unit.

The three-axis gyro sensor is configured to detect a first rotation angle of the first plane and a second rotation angle of the second plane; the second determining sub-circuit is configured to determine the first rotation direction of the first plane based on the first rotation angle; and the third determining sub-unit is configured to determine that the second rotation direction of the second plane based on the second rotation angle.

In the wearable device as described above, the operation control portion can further include a control sub-portion, which is configured to adjust a display direction of a display panel of the wearable device based on the wearing state of the wearable device.

In a third aspect, the present disclosure further provides a smart control system. The smart control system includes a terminal and a wearable device. The wearable device can be based on any embodiments of the wearable device as described above, and is configured to control an operation of the terminal based on the wearing state of the wearable device on the wearer.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a first aspect, the present disclosure provides a method for controlling an annular wearable device. The annular wearable device can be worn on the arms of the wearer.

Figure 1A:
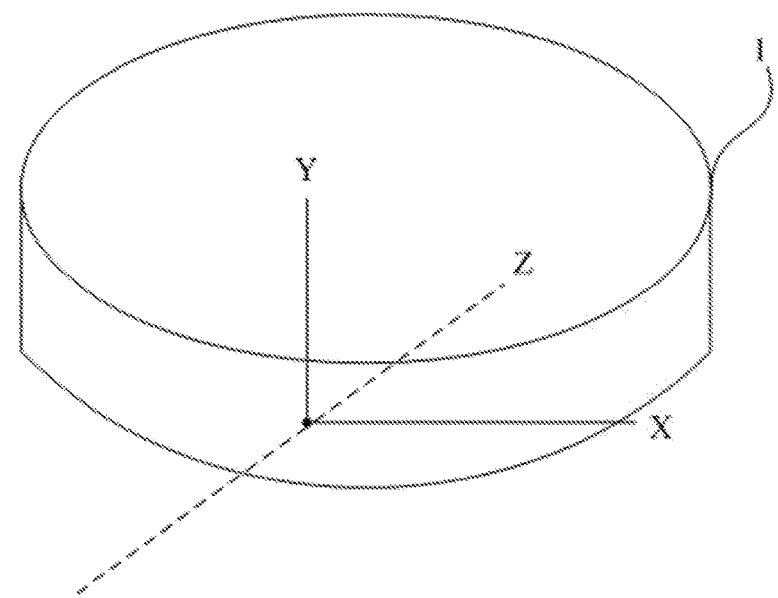
FIG. 1A and FIG. 1B are schematic diagrams illustrating three directions in an annular wearable device according to some embodiments of the present disclosure.
Figure 1B:
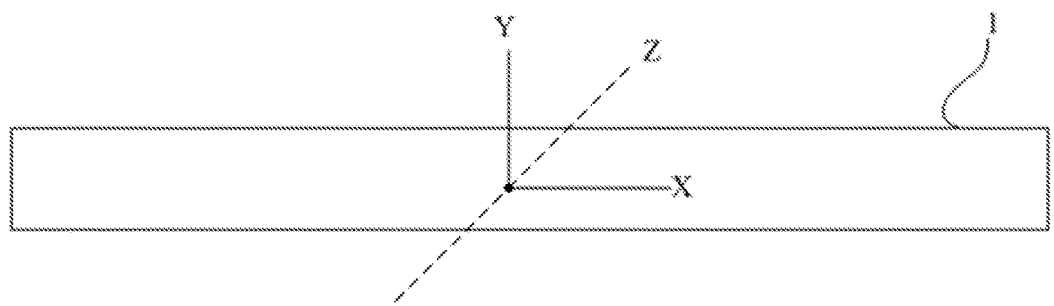

FIG. 1A and FIG. 1B illustrate the three directions in an annular wearable device according to some embodiments of the present disclosure. FIG. 1B illustrates the annular wearable device as shown in FIG. 1A when unfolded. As illustrated in FIG. 1A and FIG. 1B, a direction that is parallel to an extending direction of the annular wearable device 1 and parallel to a surface of the annular wearable device 1 is a first direction X; a direction that is perpendicular to the first direction X and parallel to the surface of the annular wearable device 1 is a second direction Y, and the second direction Y is configured to be a fixed direction relative to the annular wearable device 1; and a direction that is perpendicular to the surface of the annular wearable device 1 is a third direction Z.

As such, the method for controlling an annular wearable device can comprise: controlling an operation of the annular wearable device by detecting a relative positional change between the first direction, the second direction, and the third direction. Herein, the relative positional change is referred to as a change of a coordinate along the first direction, the second direction, or the third direction.

The method as mentioned above can control the operation of the annular wearable device by detecting the relative positional changes between the first direction, the second direction, and the third direction. For example, raising a left arm can be configured to start the operation; raising a right arm can be configured to shut down the operation, waving the left arm can be configured to slide to the left side, and waving the right arm can be configured to slide to the right side, or some other similar simple controls. As such, the operational control (i.e. controlling of the operations) thus does not depend on the display direction of the display panel, but rather depends on some movements of a user, thereby bringing more convenience to the user.

It should be noted that in the aforementioned control method, an arm can comprise an arm, a hand, or a finger of the wearer.

Figure 2:
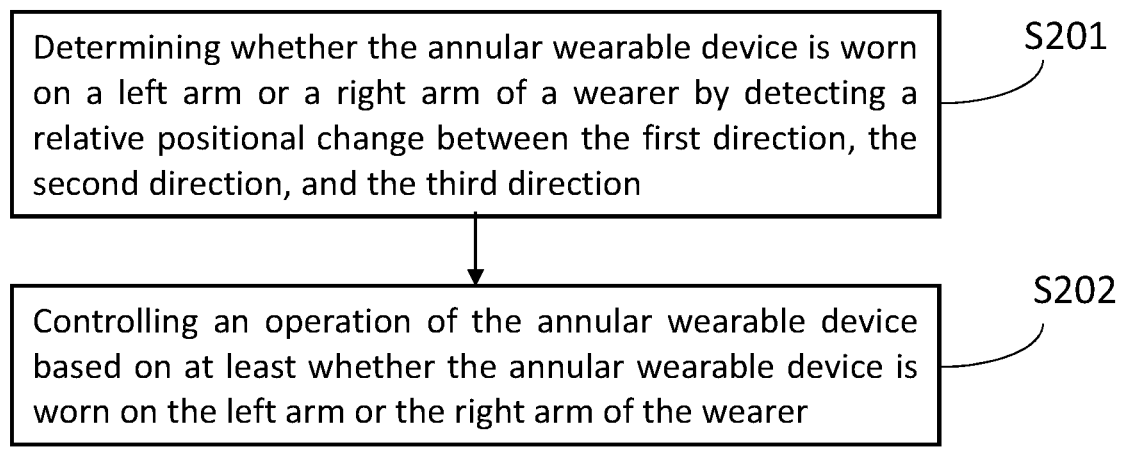
FIG. 2 is a flow chart of a method for controlling an annular wearable device according to some embodiments of the present disclosure.

FIG. 2 is a flow chart of a method for controlling an annular wearable device according to some embodiments of the present disclosure. As shown in FIG. 2, in some embodiments of the method, the controlling an operation of the annular wearable device by detecting a relative positional change between the first direction, the second direction, and the third direction can specifically comprise the following steps:

S201: determining whether the annular wearable device is worn on a left arm or a right arm of the wearer by detecting a relative positional change between the first direction, the second direction, and the third direction; and S202: controlling an operation of the annular wearable device based on at least whether the annular wearable device is worn on the left arm or the right arm of the wearer.

Figure 3:
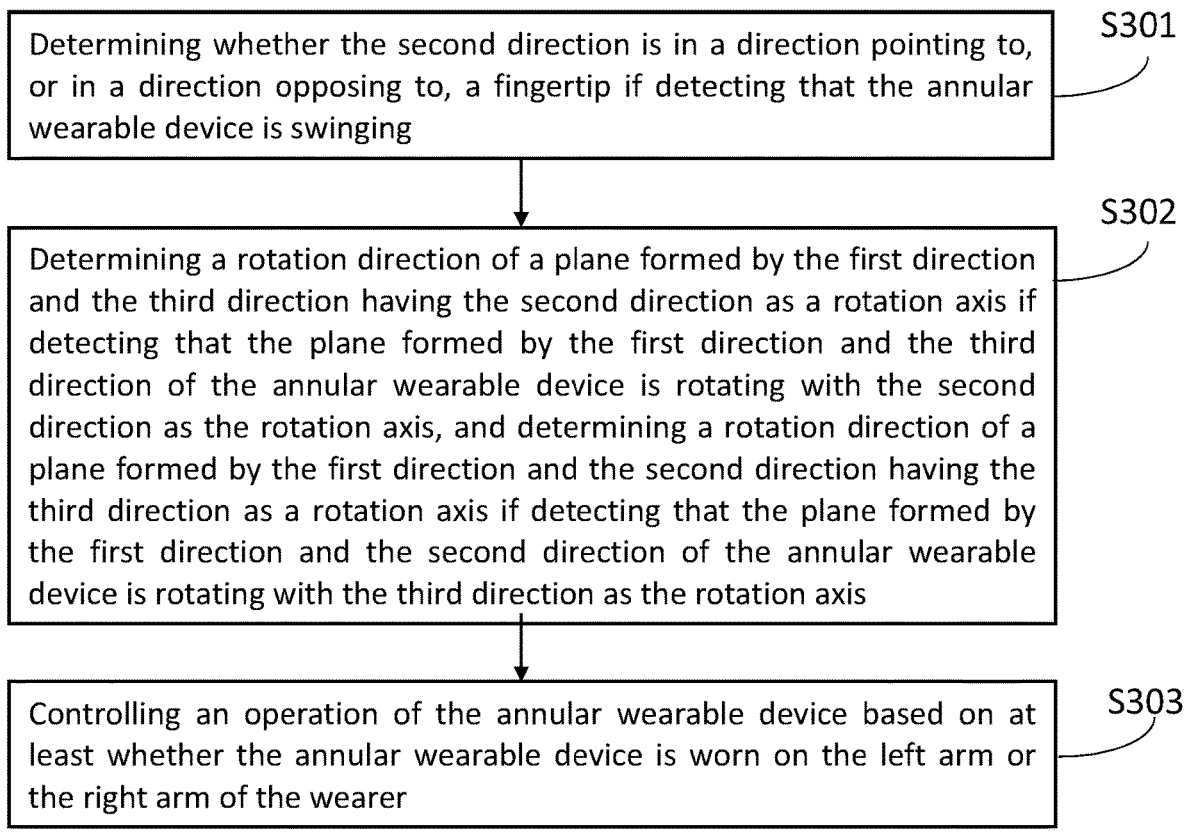
FIG. 3 is a flow chart illustrating the sub-steps for determining whether the annular wearable device is worn on a left arm or a right arm of a wearer according to some embodiments of the present disclosure.

According to some embodiments of the method, Step S201 (i.e., the determining whether the annular wearable device is worn on the left arm or the right arm of the wearer by detecting the relative positional change between the first direction, the second direction, and the third direction) can specifically comprise the following sub-steps as shown in FIG. 3:

S301: determining a pointing direction as the second direction (i.e., determining whether the second direction is in a direction pointing to, or in a direction opposing to, a fingertip) upon detecting that the annular wearable device is swinging;

S302: determining a first rotation direction of a first plane formed by the first direction and the third direction having the second direction as a rotation axis if detecting that the first plane formed by the first direction and the third direction of the annular wearable device is rotating with the second direction as the rotation axis, and determining a second rotation direction of a second plane formed by the first direction and the second direction having the third direction as a rotation axis if detecting that the second plane formed by the first direction and the second direction of the annular wearable device is rotating with the third direction as the rotation axis;

S303: determining whether the annular wearable device is worn on the left arm or the right arm of the wearer based on the pointing direction of the second direction, the first rotation direction of the first plane formed by the first direction and the third direction, and the second rotation direction of the second plane formed by the first direction and the second direction.

In the embodiments of the method for controlling an annular wearable device as described above, a wearing state of the annular wearable device can be determined based on the pointing direction of the second direction, the first rotation direction of the first plane formed by the first direction and the third direction, and the second rotation direction of the second plane formed by the first direction and the second direction.

Herein when the annular wearable device is swinging, the wearer is typically walking. When the first plane formed by the first direction and the third direction of the annular wearable device is rotating with the second direction as the rotation axis and when the second plane formed by the first direction and the second direction is rotating with the third direction as the rotation axis, it is typically a movement that the wearer bends the arm and turns the wrist to check the annular wearable device. As such the control method disclosed herein allows an automatic determination of the wearing state of the annular wearable device based on the changes of directions along with a series of movements of the wearer of the annular wearable device. Because the control method does not need the wearer to manually determine and confirm, it brings more convenient for use.

According to some embodiments of the method, step S202 (i.e., controlling an operation of the annular wearable device based on at least whether the annular wearable device is worn on the left arm or the right arm of the wearer) can specifically comprise: adjusting a display direction of a display panel of the annular wearable device based on the pointing direction of the second direction and whether the annular wearable device is worn on the left arm or right arm of the wearer.

As such, the control method allows an automatic control over the display direction of the display panel based on the change of directions of the annular wearable device along with a series of movements of the wearer. In contrast, existing wrist wearable device typically can only have normal display based on the wearer's manual input according to whether the device is on the left arm or the right arm, as well as the wearing direction of the wearable device. Thus the control method as disclosed herein can eliminate the need for manual setting, bringing more convenient for use.

In some embodiments of the method as described above, if the third direction is in a direction opposing to the wearer, step S303 (i.e. the determining whether the annular wearable device is worn on the left arm or the right arm of the wearer based on the pointing direction of the second direction, the first rotation direction of the first plane formed by the first direction and the third direction, and the second rotation direction of the second plane formed by the first direction and the second direction) can comprise:

determining that the annular wearable device is worn on the right arm of the wearer, if the second direction is in the direction pointing to the fingertip, the first rotation direction of the first plane formed by the first direction and the third direction having the second direction as the rotation axis is clockwise when viewed from the angle of the wearer, and the second rotation direction of the second plane formed by the first direction and the second direction having the third direction as the rotation axis is counter-clockwise when viewed from the angle of the wearer, or if the second direction is in the direction opposing to to the fingertip, the first rotation direction of the first plane formed by the first direction and the third direction having the second direction as the rotation axis is counter-clockwise when viewed from the angle of the wearer, and the second rotation direction of the second plane formed by the first direction and the second direction having the third direction as the rotation axis is counter-clockwise when viewed from the angle of the wearer; or determining that the annular wearable device is worn on the left arm of the wearer, if the second direction is in the direction pointing to the fingertip, the first rotation direction of the first plane formed by the first direction and the third direction having the second direction as the rotation axis is counter-clockwise when viewed from the angle of the wearer, and the second rotation direction of the second plane formed by the first direction and the second direction having the third direction as the rotation axis is clockwise when viewed from the angle of the wearer, or if the second direction is in the direction opposing to to the fingertip, the first rotation direction of the first plane formed by the first direction and the third direction having the second direction as the rotation axis is clockwise when viewed from the angle of the wearer, and the second rotation direction of the second plane formed by the first direction and the second direction having the third direction as the rotation axis is clockwise when viewed from the angle of the wearer.

In some embodiments of the method as described above, if the third direction is in a direction pointing to the wearer, step S303 (i.e. the determining whether the annular wearable device is worn on the left arm or the right arm of the wearer based on the pointing direction of the second direction, the first rotation direction of the first plane formed by the first direction and the third direction, and the second rotation direction of the second plane formed by the first direction and the second direction) can comprise:

determining that the annular wearable device is worn on the right arm of the wearer, if the second direction is in the direction pointing to the fingertip, the first rotation direction of the first plane formed by the first direction and the third direction having the second direction as the rotation axis is clockwise when viewed from the angle of the wearer, and the second rotation direction of the second plane formed by the first direction and the second direction having the third direction as the rotation axis is clockwise when viewed from the angle of the wearer, or if the second direction is in the direction opposing to to the fingertip, the first rotation direction of the first plane formed by the first direction and the third direction having the second direction as the rotation axis is counter-clockwise when viewed from the angle of the wearer, and the second rotation direction of the second plane formed by the first direction and the second direction having the third direction as the rotation axis is clockwise when viewed from the angle of the wearer; or determining that the annular wearable device is worn on the left arm of the wearer, if the second direction is in the direction pointing to the fingertip, the first rotation direction of the first plane formed by the first direction and the third direction having the second direction as the rotation axis is counter-clockwise when viewed from the angle of the wearer, and the second rotation direction of the second plane formed by the first direction and the second direction having the third direction as the rotation axis is counter-clockwise when viewed from the angle of the wearer, or if the second direction is in the direction opposing to to the fingertip, the first rotation direction of the first plane formed by the first direction and the third direction having the second direction as the rotation axis is clockwise when viewed from the angle of the wearer, and the second rotation direction of the second plane formed by the first direction and the second direction having the third direction as the rotation axis is counter-clockwise when viewed from the angle of the wearer.

In practice, when the wearer is viewing the display screen of the annular wearable device, the arm of the wearer typically bends and the wrist of the wearer turns in a certain angle. As such, when the wearer perform the above mentioned movements, the first rotation direction of the first plane formed by the first direction and the third direction having the second direction as the rotation axis and the second rotation direction of the second plane formed by the first direction and the second direction having the third direction as the rotation axis, need to be determined.

In some embodiments of the method as described above, the determining the first rotation direction of the first plane formed by the first direction and the third direction having the second direction as the rotation axis can comprise:

detecting a first rotation angle of the first plane formed by the first direction and the third direction having the second direction as the rotation axis by means of a three-axis gyro sensor, and determining that the first rotation direction of the first plane formed by the first direction and the third direction having the second direction as the rotation axis is counter-clockwise when viewed from the angle of the wearer if the first rotation angle is larger than a first preset positive value, or determining that the first rotation direction of the first plane formed by the first direction and the third direction having the second direction as the rotation axis is clockwise when viewed from the angle of the viewer if the first rotation angle is smaller than a negative value of the first preset positive value.

Figure 4A:
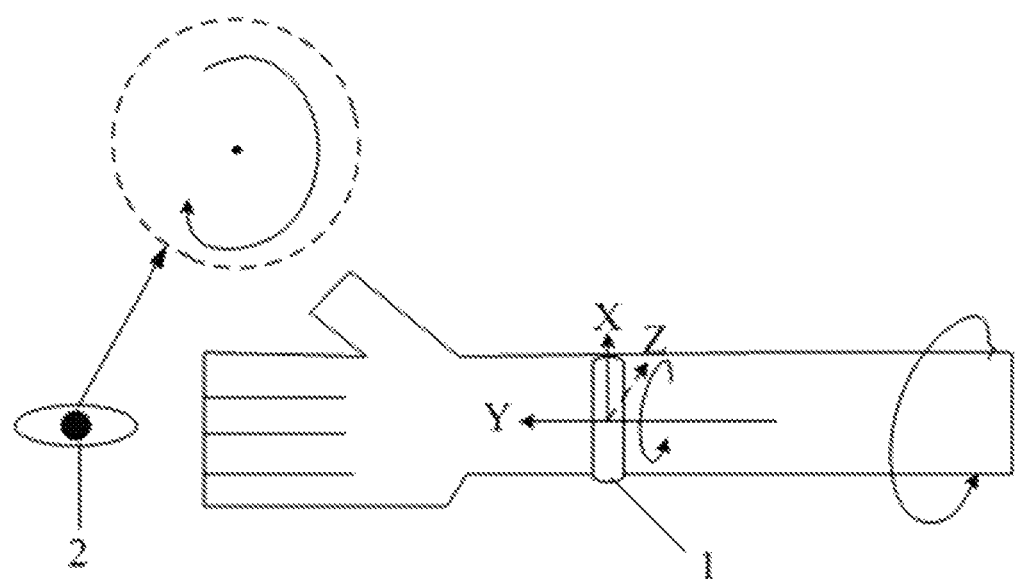
FIG. 4A and FIG. 4B are the diagrams illustrating the rotation directions when a wrist of a user wearing an annular wearable device turns according to some embodiments of the present disclosure.
Figure 4B:
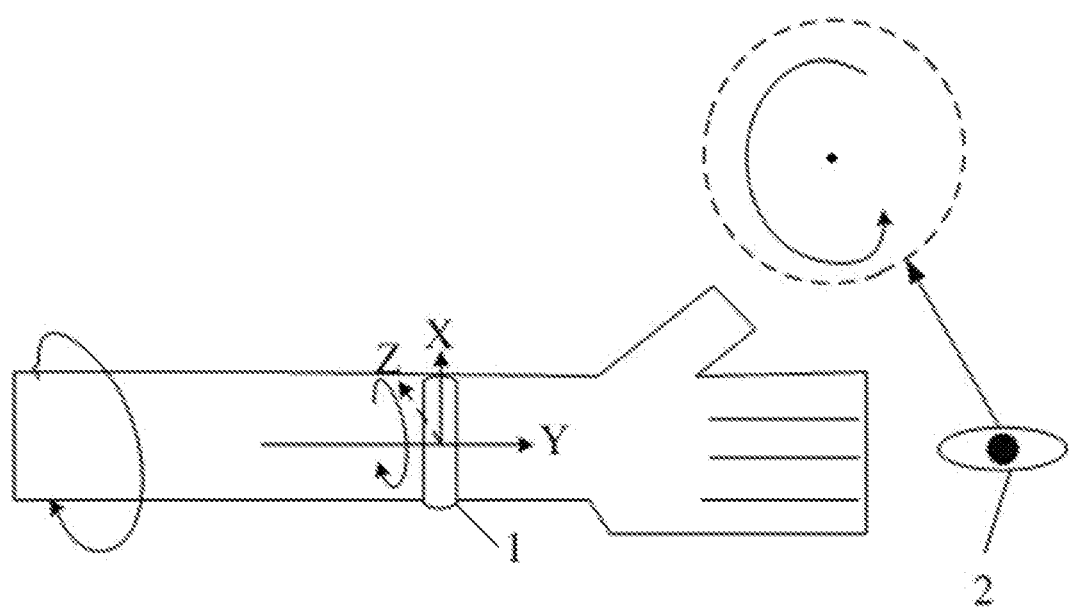

It should be noted that in the embodiments of the method as described above, the first rotation direction of the first plane formed by the first direction and the third direction having the second direction as the rotation axis is determined with the second direction Y in a direction pointing to the fingertip as the reference positive direction, i.e., viewing the first rotation direction of the first plane formed by the first direction X and the third direction Z from the side of the fingertip, as illustrated in FIG. 4A and FIG. 4B.

As shown in FIG. 4A, when the right arm turns towards a side close to the body, the first rotation direction of the first plane formed by the first direction X and the third direction Z observed by eyes 2 is clockwise, as shown by the dotted line frame in FIG. 4A, and if detected, the first rotation angle of the first plane formed by the first direction X and the third direction Z having the second direction Y as the rotation axis is smaller than the negative value of the first preset positive value.

As shown in FIG. 4B, when the left arm turns towards a side close to the body, the first rotation direction of the first plane formed by the first direction X and the third direction Z observed by eyes 2 is counter-clockwise, as shown by the dotted line frame in FIG. 4B, and if detected with instruments, the first rotation angle of the first plane formed by the first direction X and third direction Z having the second direction Y as the rotation axis is larger than the first preset positive value.

In practice, the first preset positive value can be an angle larger than 0 degree and smaller than 90 degree. However, if the first preset positive value is set to be too small, there will be a determined result even when the wrist moves just a little bit, which easily causes misjudgement. On the other hand, however, if the first preset value is set to be too large, there will be a determined result only when the wrist turns by a very large angle, resulting in insensitivity and leading to inaccurate results.

In some embodiments of the method as described above, the determining the second rotation direction of the second plane formed by the first direction and the second direction having the third direction as the rotation axis can comprise:

detecting a second rotation angle of the first plane formed by the first direction and the second direction having the third direction as the rotation axis by means of a three-axis gyro sensor, and determining that the second rotation direction of the second plane formed by the first direction and the second direction having the third direction as the rotation axis is counter-clockwise when viewed from the angle of the wearer if the second rotation angle is larger than a second preset positive value, or determining that the second rotation direction of the second plane formed by the first direction and the second direction having the third direction as the rotation axis is clockwise when viewed from the angle of the viewer if the second rotation angle is smaller than a negative value of the second preset positive value.

Figure 5A:
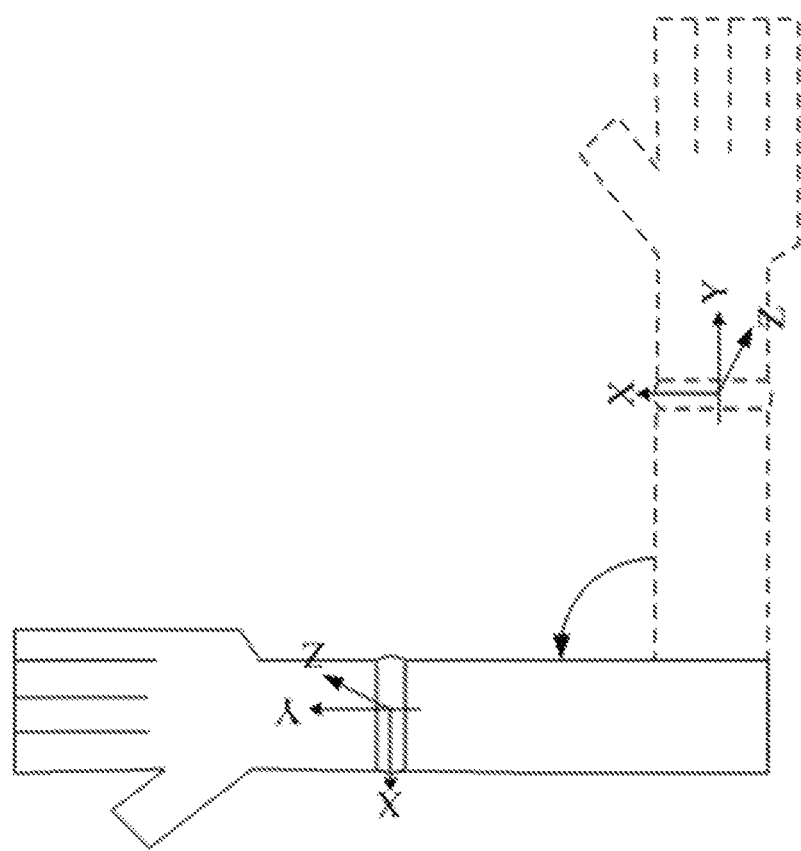
FIG. 5A and FIG. 5B are diagrams illustrating the rotation directions when an arm of a user wearing an annular wearable device bends according to some embodiments of the present disclosure.
Figure 5B:
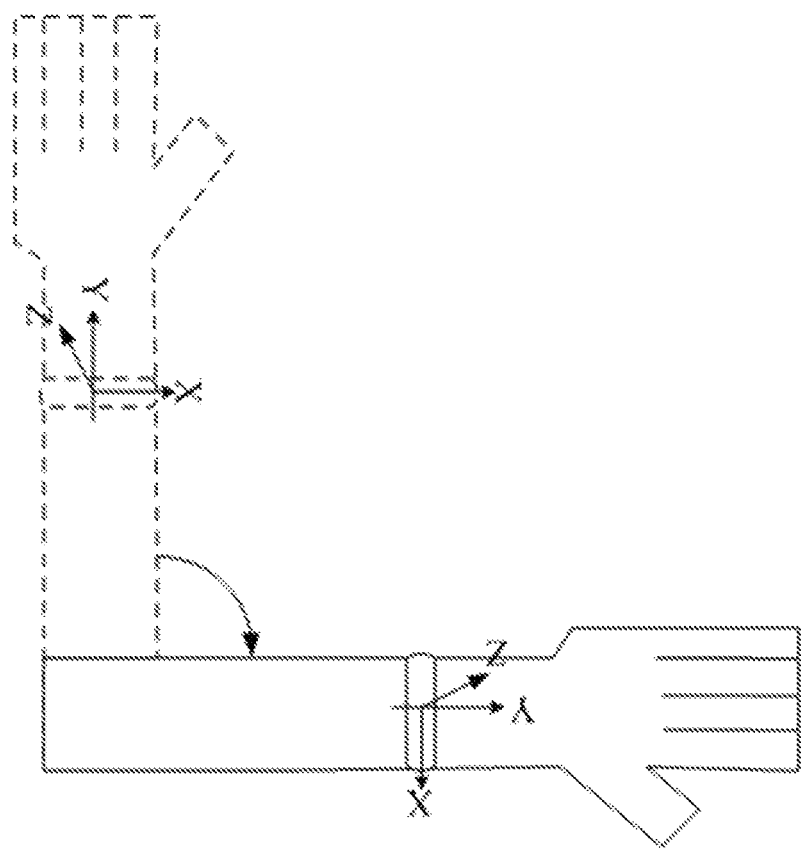

It should be noted that in the embodiments of the method as described above, the second rotation direction of the second plane formed by the first direction and the second direction having the third direction as the rotation axis is determined with the third direction Z in a direction opposing to the body of the wearer as the reference positive direction, i.e., viewing the second rotation direction of the second plane formed by the first direction X and the second direction Y from the top of the annular wearable device, as illustrated in FIG. 5A and FIG. 5B.

As shown in FIG. 5A, when the right arm bends, the second rotation direction of the second plane formed by the first direction X and the second direction Y observed by eyes is counter-clockwise, and if detected with instruments, the second rotation angle of the first plane formed by the first direction X and the second direction Y having the third direction Z as the rotation axis is larger than the second preset positive value.

As shown in FIG. 5B, when the left arm bends, the second rotation direction of the second plane formed by the first direction X and the second direction Y observed by eyes 2 is clockwise, and if detected with instruments, the second rotation angle of the first plane formed by the first direction X and the second direction Y having the third direction Z as the rotation axis is smaller than the negative value of the second preset positive value.

In practice, the second preset positive value can be an angle larger than 0 degree and smaller than 90 degree. However, if the second preset positive value is set to be too small, there will be a determined result even when the wrist moves just a little bit, which easily causes misjudgement. On the other hand, however, if the second preset value is set to be too large, there will be a determined result only when the wrist turns by a very large angle, resulting in insensitivity and leading to inaccurate results.

In some embodiments of the method as described above, the determining whether the second direction is in a direction pointing to, or in a direction opposing to, a fingertip can comprise:

detecting an acceleration value along the second direction when the annular wearable device is swinging by means of a three-axis accelerometer, and determining that the second direction is in a direction opposing to the fingertip if the acceleration value is positive, or determining that the second direction is in a direction pointing to the fingertip if the acceleration value is negative.

Figure 6:
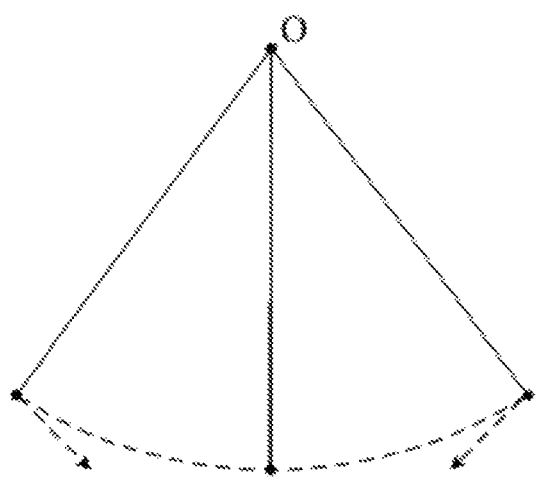
FIG. 6 is a diagram illustrating the simple pendulum movement of the arms when the wearer is walking according to some embodiments of the present disclosure.

In practice, because the arms of a wearer are in a simple reciprocating pendulum motion by moving back and forth repeatedly, as shown in FIG. 6, its normal direction is parallel to the second direction Y, and its tangent direction is parallel to the first direction X, thus the acceleration value along the normal direction of the simple pendulum motion points to point O, i.e., points to the shoulder. Thus the direction of the second direction Y can be determined based on whether the acceleration value of the second direction Y is positive or negative, and the acceleration value of the second direction Y can be measured by a three-axis accelerometer.

As such, if the acceleration value of the second direction Y measured by the three-axis accelerometer is positive, the second direction Y is determined to point to point O, and the second direction Y can be further determined to be in a direction opposing to the fingertip. If the acceleration value is negative, the second direction Y is determined to oppose to point O, and the second direction Y can be further determined to be in a direction pointing to the fingertip.

Furthermore, because in real life, the arms are normally in a simple reciprocating pendulum motion only when the wearer is walking, the determination of the direction of the second direction can only be done when the wearer is walking. A motion state of the wearer can generally be determined based on a stride frequency (i.e., the number of steps per unit time). For example, a motion state usually comprises resting, walking, running etc., and the wearer is in walking state only if the stride frequency is within a certain range.

In the following, some embodiments of the method for controlling an annular wearable device are illustrated with examples in which the third direction is in a direction pointing to the wearer or is in a direction opposing to the wearer.

Embodiment 1

Figure 7:
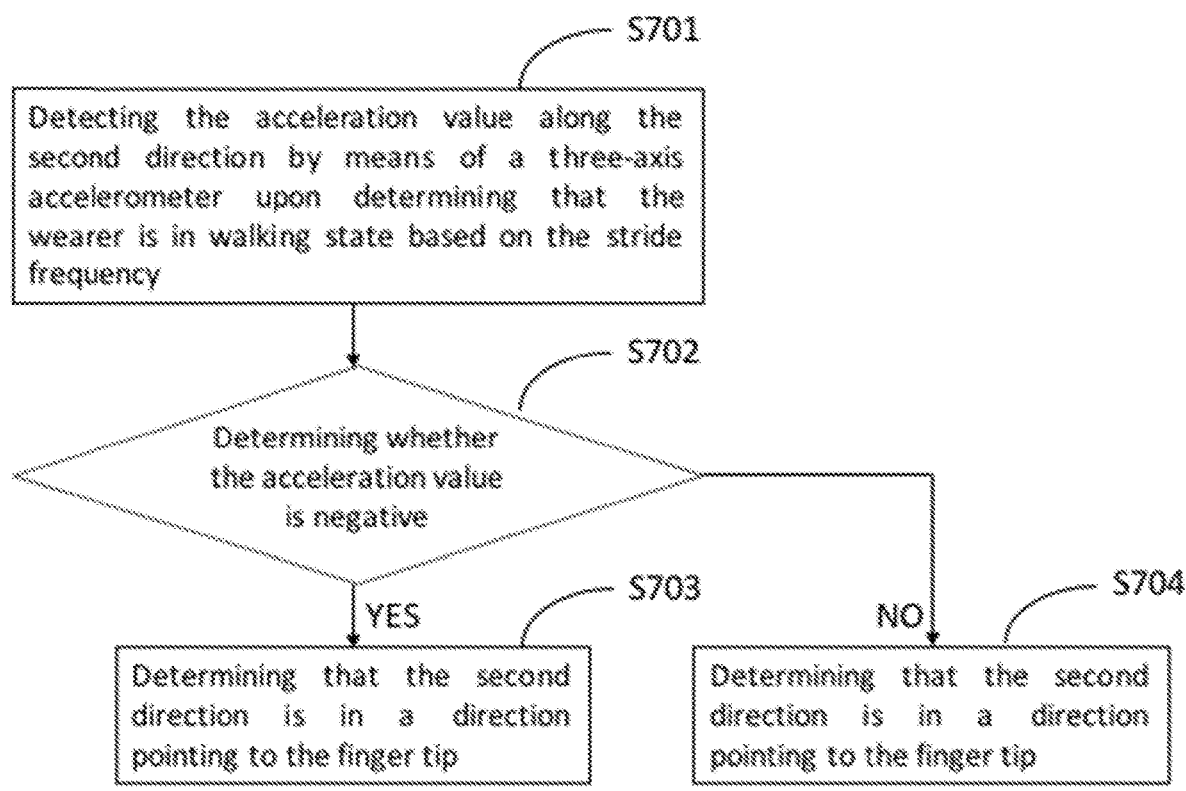
FIG. 7 is a flow chart illustrating the sub-steps of determining the direction of the second direction according to some embodiments of the present disclosure.

If the third direction is in a direction opposing to the wearer, the method comprises:

(1) determining whether the second direction is in a direction pointing to the fingertip upon detecting that the annular wearable device is swinging. In some embodiments, as shown in FIG. 7, the step comprises the following sub-steps:

S701: detecting the acceleration value along the second direction by means of a three-axis accelerometer upon determining that the wearer is in walking state based on the stride frequency;

S702: determining whether the acceleration value is negative;

S703: determining that the second direction is in a direction pointing to the fingertip if the acceleration value is negative;

S704: determining that the second direction is in a direction opposing to the fingertip if the acceleration value is positive.

Figure 8:
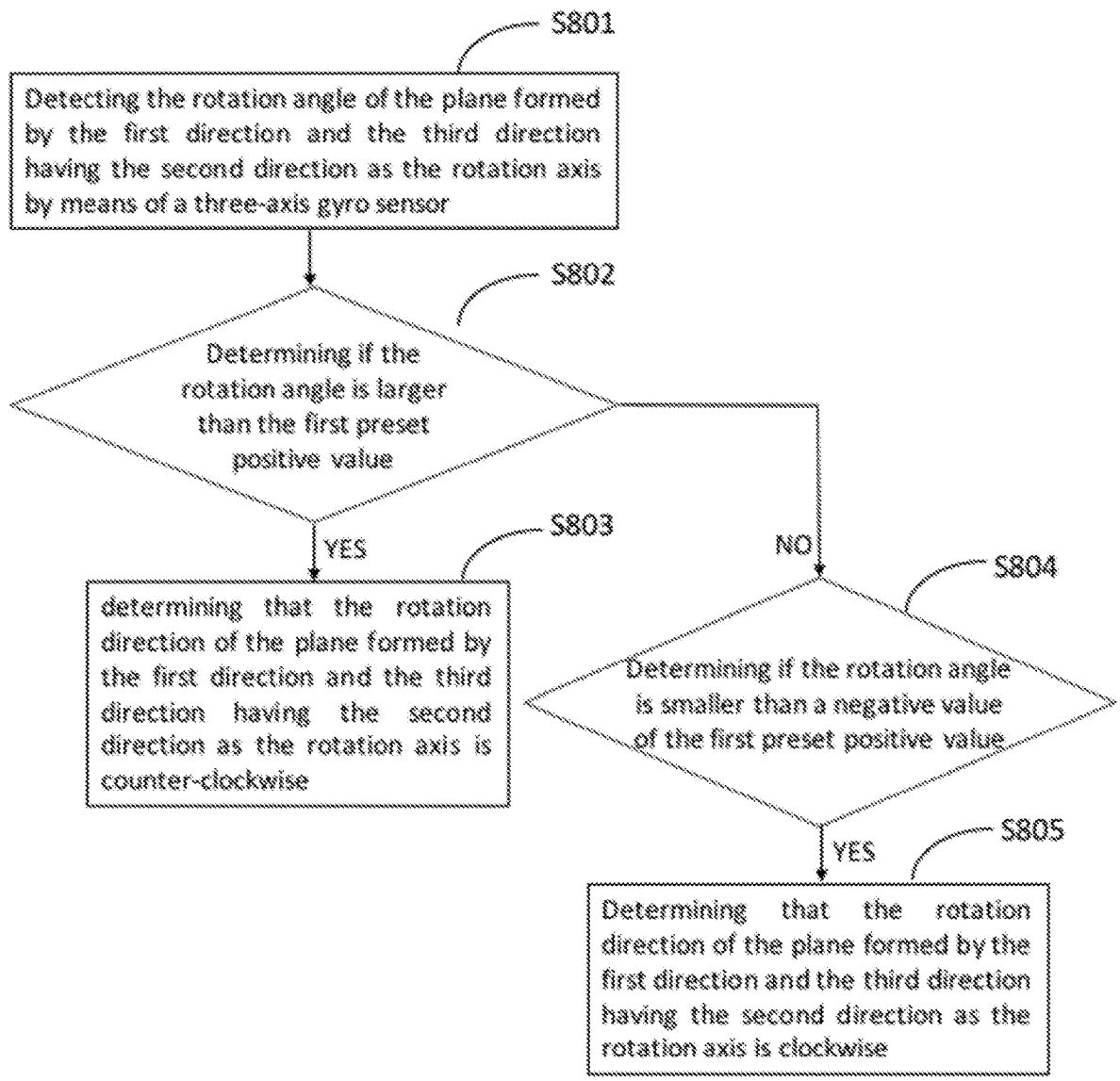
FIG. 8 is a flowchart illustrating the sub-steps of determining the first rotation direction of the first plane formed by the first direction and the third direction according to some embodiments of the present disclosure.

(2) determining a first rotation direction of the first plane formed by the first direction and the third direction having the second direction as the rotation axis upon detecting that the first plane formed by the first direction and the third direction of the annular wearable device is rotating with the second direction as the rotation axis (i.e., when the wrist of the wearer turns towards the body). In some embodiments, as shown in FIG. 8, the step comprises the following sub-steps:

S801: detecting the first rotation angle of the first plane formed by the first direction and the third direction having the second direction as the rotation axis by means of a three-axis gyro sensor;

S802: determining whether the first rotation angle is larger than the first preset positive value, and executing step S803 if yes, or step S804 if no;

S803: determining that the first rotation direction of the first plane formed by the first direction and the third direction having the second direction as the rotation axis is counter-clockwise when viewed from the angle of the wearer;

S804: determining whether the first rotation angle is smaller than the negative value of the first preset positive value, and executing step S805 if yes;

S805: determining that the first rotation direction of the first plane formed by the first direction and the third direction having the second direction as the rotation axis is clockwise when viewed from the angle of the wearer.

Figure 9:
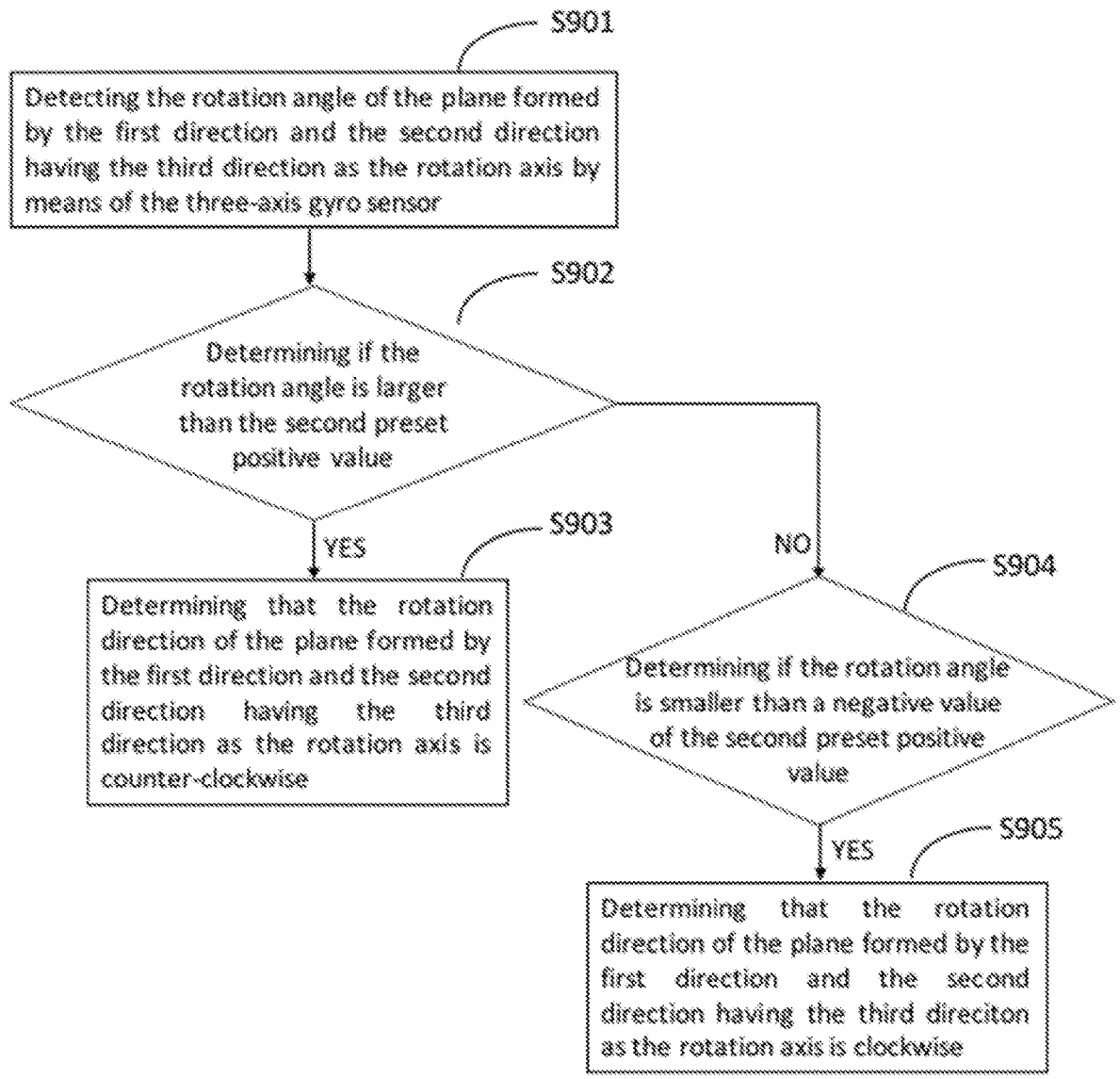
FIG. 9 is a flowchart illustrating the sub-steps of determining the second rotation direction of the second plane formed by the first direction and the second direction according to some embodiments of the present disclosure.

(3) determining the second rotation direction of the second plane formed by the first direction and the second direction upon detecting that the second plane formed by the first direction and the second direction of the annular wearable device is rotating with the third direction as the rotation axis (i.e., the arms of the wearer bend). In some embodiments, as shown in FIG. 9, the step comprises the following sub-steps:

S901: detecting the second rotation angle of the first plane formed by the first direction and the second direction having the third direction as the rotation axis by means of the three-axis gyro sensor;

S902: determining whether the second rotation angle is larger than the second preset positive value, and executing step S903 if yes or step S904 if no;

S903: determining that the second rotation direction of the second plane formed by the first direction and the second direction having the third direction as the rotation axis is counter-clockwise when viewed from the angle of the wearer;

S904: determining whether the second rotation angle is smaller than the negative value of the second preset positive value, and executing step S905 if yes;

S905: determining that the second rotation direction of the second plane formed by the first direction and the second direction having the third direction as the rotation axis is clockwise when viewed from the angle of the wearer.

(4) determining whether the annular wearable device is worn on the left arm or right arm of the wearer based on the pointing direction of the second direction, the first rotation direction of the first plane formed by the first direction and the third direction, and the second rotation direction of the second plane formed by the first direction and the second direction. In some embodiments of the method, the step specifically comprises:

determining that the annular wearable device is worn on the right arm of the wearer if the second direction is in a direction the pointing to the fingertip, the first rotation direction of the first plane formed by the first direction and the third direction having the second direction as the rotation axis is clockwise when viewed from the angle of the wearer, and the the second rotation direction of the second plane formed by the first direction and the second direction having the third direction as the rotation axis is counter-clockwise when viewed from the angle of the viewer, or if the second direction is in a direction opposing to the fingertip, the first rotation direction of the first plane formed by the first direction and the third direction having the second direction as the rotation axis is counter-clockwise when viewed from the angle of the viewer, and the second rotation direction of the second plane formed by the first direction and the second direction having the third direction as the rotation axis is counter-clockwise when viewed from the angle of the wearer; and determining that the annular wearable device is worn on the left arm of the wearer if the second direction is in a direction pointing to the fingertip, the first rotation direction of the first plane formed by the first direction and the third direction having the second direction as the rotation axis is counter-clockwise when viewed from the angle of the wearer, and the the second rotation direction of the second plane formed by the first direction and the second direction having the third direction as the rotation axis is clockwise when viewed from the angle of the viewer, or if the second direction is in a direction opposing to the fingertip, the first rotation direction of the first plane formed by the first direction and the third direction having the second direction as the rotation axis is clockwise when viewed from the angle of the viewer, and the second rotation direction of the second plane formed by the first direction and the second direction having the third direction as the rotation axis is clockwise when viewed from the angle of the wearer.

Furthermore, in practical implementation, the second direction can be marked as $Y_0=1$ if in a direction pointing to the fingertip or as $Y_0=-1$ if in a direction opposing to the fingertip; the first rotation direction of the first plane formed by the first direction and the third direction having the second direction as the rotation axis can be marked as $Y_{xz}=-1$ if clockwise or as $Y_{xz}=1$ if counter-clockwise when viewed from the angle of the wearer; and the second rotation direction of the second plane formed by the first direction and the second direction having the third direction as the rotation axis can be marked as $Z_{xy}=-1$ if clockwise or as $Z_{xy}=1$ if counter-clockwise when viewed from the angle of the wearer.

As such, if it is determined that $Y_0=1$, $Y_{xz}=-1$, $Z_{xy}=1$, or $Y_0=-1$, $Y_{xz}=1$, $Z_{xy}=1$, (i.e., $Z_{xy}=1$, $Y_0 \times Y_{xz}=-1$), the annular wearable device is determined to be worn on the right arm of the wearer; if it is determined that $Y_0=1$, $Y_{xz}=1$, $Z_{xy}=-1$, or $Y_0=-1$, $Y_{xz}=-1$, $Z_{xy}$-1 (i.e., $Z_{xy}=-1$, $Y_0 \times Y_{xz}=1$), the annular wearable device is determined to be worn on the left arm of the wearer.

(5) determining the display direction of the display panel of the annular wearable device based on the direction of the second direction and whether the annular wearable device is worn on the left arm or right arm of the wearer.

Embodiment 2

If the third direction Z is in a direction pointing to the wearer, except step (4), other steps of the method are substantially identical as in embodiment 1.

In embodiment 2, step (4) determining whether the annular wearable device is worn on the left arm or right arm of the wearer based on the pointing direction of the second direction, the first rotation direction of the first plane formed by the first direction and the third direction, and the second rotation direction of the second plane formed by the first direction and the second direction specifically comprises:

determining that the annular wearable device is worn on the right arm of the wearer if the second direction is in a direction the pointing to the fingertip, the first rotation direction of the first plane formed by the first direction and the third direction having the second direction as the rotation axis is clockwise when viewed from the angle of the wearer, and the the second rotation direction of the second plane formed by the first direction and the second direction having the third direction as the rotation axis is clockwise when viewed from the angle of the viewer, or if the second direction is in a direction opposing to the fingertip, the first rotation direction of the first plane formed by the first direction and the third direction having the second direction as the rotation axis is counter-clockwise when viewed from the angle of the viewer, and the second rotation direction of the second plane formed by the first direction and the second direction having the third direction as the rotation axis is clockwise when viewed from the angle of the wearer; and determining that the annular wearable device is worn on the left arm of the wearer if the second direction is in a direction pointing to the fingertip, the first rotation direction of the first plane formed by the first direction and the third direction having the second direction as the rotation axis is counter-clockwise when viewed from the angle of the wearer, and the the second rotation direction of the second plane formed by the first direction and the second direction having the third direction as the rotation axis is counter-clockwise when viewed from the angle of the viewer, or if the second direction is in a direction opposing to the fingertip, the first rotation direction of the first plane formed by the first direction and the third direction having the second direction as the rotation axis is clockwise when viewed from the angle of the viewer, and the second rotation direction of the second plane formed by the first direction and the second direction having the third direction as the rotation axis is counter-clockwise when viewed from the angle of the wearer.

Furthermore, in practical implementation, the second direction can be marked as $Y_0=1$ if in a direction pointing to the fingertip or as $Y_0=-1$ if in a direction opposing to the fingertip; the first rotation direction of the first plane formed by the first direction and the third direction having the second direction as the rotation axis can be marked as $Y_{xz}=-1$ if clockwise or as $Y_{xz}=1$ if counter-clockwise when viewed from the angle of the wearer; and the second rotation direction of the second plane formed by the first direction and the second direction having the third direction as the rotation axis can be marked as $Z_{xy}=-1$ if clockwise or as $Z_{xy}=1$ if counter-clockwise when viewed from the angle of the wearer.

As such, if it is determined that $Y_0=1$, $Y_{xz}=-1$, $Z_{xy}=-1$, or $Y_0=-1$, $Y_{xz}=1$, $Z_{xy}=-1$, (i.e., $Z_{xy}=-1$, $Y_0\times Y_{xz}=-1$), the annular wearable device is determined to be worn on the right arm of the wearer; if it is determined that $Y_0=1$, $Y_{xz}=1$, $Z_{xy}=1$, or $Y_0=-1$, $Y_{xz}=-1$, $Z_{xy}=1$ (i.e., $Z_{xy}=1$, $Y_0\times Y_{xz}=1$), the annular wearable device is determined to be worn on the left arm of the wearer.

The method for controlling a annular wearable device as described above can determine which hand of the wearer the annular wearable device is worn on by detecting a relationship between the first direction, the second direction, and the third direction from the series of movements the wearer is performing, as such the wearing state can be determined and the display direction of the display panel can be further determined. This method can thus avoid manual setting of the wearing state, bringing convenience to the user.

In a second aspect, the present disclosure further provides an annular wearable device based on the method as described above. The annular wearable device comprises a main body. The annular wearable device is configured to be worn on an arm of a wearer.

The annular wearable device is configured to be worn on the arms of the wearer. A direction that is parallel to an extending direction of the annular wearable device and is parallel to a surface of the annular wearable device is a first direction. A direction that is perpendicular to the first direction and is parallel to the surface of the annular wearable device is a second direction, and a direction of the second direction that is opposing to the annular wearable device is a fixed direction. A direction that is perpendicular to the surface of the annular wearable device is a third direction.

The annular wearable device further comprises: an operation control portion, configured to control an operation of the main body by detecting a relative positional change between the first direction, the second direction, and the third direction.

Figure 10:
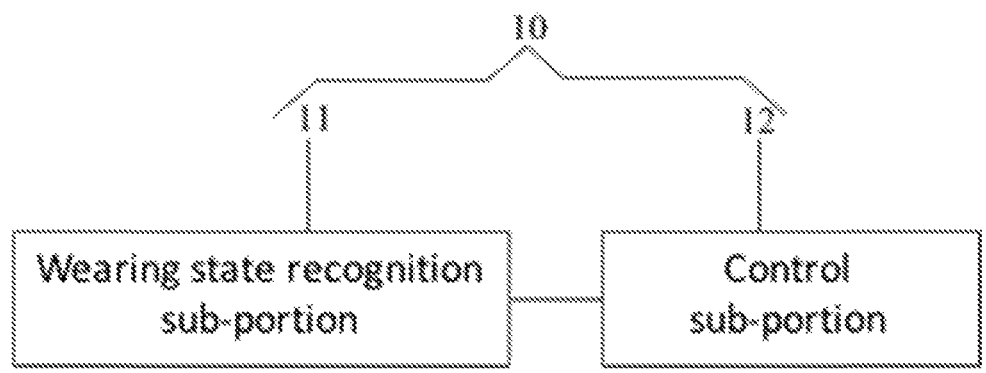
FIG. 10 is a structural diagram illustrating an operation control portion of an annular wearable device according to some embodiments of the present disclosure.

FIG. 10 illustrates an operation control portion of an annular wearable device according to some embodiments of the present disclosure.

As shown in FIG. 10, the operation control portion 10 can comprise:

a wearing state recognition sub-portion 11, configured to determine whether the annular wearable device is worn on a left arm or a right arm of the wearer by detecting the relative positional change between the first direction, the second direction, and the third direction; and a control sub-portion 12, configured to control the operation of the annular wearable device based on at least whether the annular wearable device is worn on the left arm or the right arm of the wearer.

According to some embodiments of the present disclosure, the control sub-portion 12 is configured to:

adjusting a display direction of a display panel based on a direction of the second direction and whether the annular wearable device is worn on the left arm or the right arm of the wearer.

Figure 11:
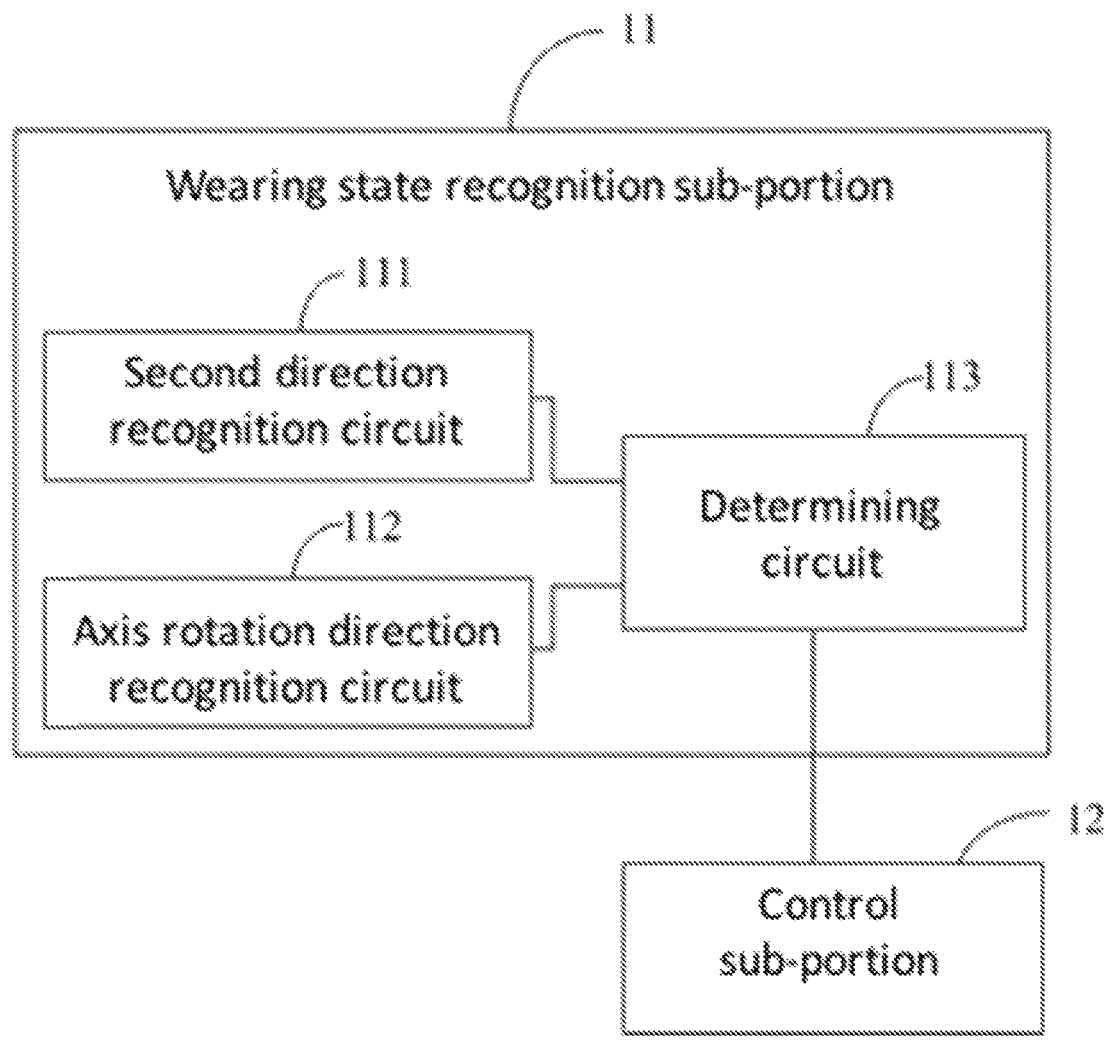
FIG. 11 is a schematic diagram illustrating a detailed structure of an operation control portion in the annular wearable device according to some embodiments of the present disclosure.

FIG. 11 illustrates a wearing state recognition sub-portion 11 in the annular wearable device according to some embodiments of the present disclosure. As shown in FIG. 11, the wearing state recognition sub-portion 11 can comprise:

a second direction recognition circuit 111, configured to determine whether the second direction is in a direction pointing to, or opposing to, the fingertip when it is detected the annular wearable device is swinging;

an axis rotation direction recognition circuit 112, configured to determine a first rotation direction of a first plane formed by the first direction and the third direction having the second direction as a rotation axis upon detecting that the first plane formed by the first direction and the third direction is rotating with the second direction as the rotation axis, and to determine a second rotation direction of a second plane formed by the first direction and the second direction having the third direction as the rotation axis upon detecting that the second plane formed by the first direction and the second direction of the annular wearable device is rotating with the third direction as the rotation axis; and a determining circuit 113, configured to determine whether the annular wearable device is worn on the left arm or the right arm of the wearer based on the pointing direction of the second direction, the first rotation direction of the first plane formed by the first direction and the third direction, and the second rotation direction of the second plane formed by the first direction and the second direction.

Specifically, in the embodiments of the annular wearable device as described above, if the third direction is in a direction opposing to the wearer, the determining circuit 113 is configured:

to determine that the annular wearable device is worn on the right arm of the wearer if the second direction is in a direction the pointing to the fingertip, the first rotation direction of the first plane formed by the first direction and the third direction having the second direction as the rotation axis is clockwise when viewed from the angle of the wearer, and the the second rotation direction of the second plane formed by the first direction and the second direction having the third direction as the rotation axis is counter-clockwise when viewed from the angle of the viewer, or if the second direction is in a direction opposing to the fingertip, the first rotation direction of the first plane formed by the first direction and the third direction having the second direction as the rotation axis is counter-clockwise when viewed from the angle of the viewer, and the second rotation direction of the second plane formed by the first direction and the second direction having the third direction as the rotation axis is counter-clockwise when viewed from the angle of the wearer; and to determine that the annular wearable device is worn on the left arm of the wearer if the second direction is in a direction pointing to the fingertip, the first rotation direction of the first plane formed by the first direction and the third direction having the second direction as the rotation axis is counter-clockwise when viewed from the angle of the wearer, and the the second rotation direction of the second plane formed by the first direction and the second direction having the third direction as the rotation axis is clockwise when viewed from the angle of the viewer, or if the second direction is in a direction opposing to the fingertip, the first rotation direction of the first plane formed by the first direction and the third direction having the second direction as the rotation axis is clockwise when viewed from the angle of the viewer, and the second rotation direction of the second plane formed by the first direction and the second direction having the third direction as the rotation axis is clockwise when viewed from the angle of the wearer.

Specifically, in the embodiments of the annular wearable device as described above, if the third direction is in a direction pointing to the wearer, the determining circuit 113 is configured:

to determine that the annular wearable device is worn on the right arm of the wearer if the second direction is in a direction the pointing to the fingertip, the first rotation direction of the first plane formed by the first direction and the third direction having the second direction as the rotation axis is clockwise when viewed from the angle of the wearer, and the the second rotation direction of the second plane formed by the first direction and the second direction having the third direction as the rotation axis is clockwise when viewed from the angle of the viewer, or if the second direction is in a direction opposing to the fingertip, the first rotation direction of the first plane formed by the first direction and the third direction having the second direction as the rotation axis is counter-clockwise when viewed from the angle of the viewer, and the second rotation direction of the second plane formed by the first direction and the second direction having the third direction as the rotation axis is clockwise when viewed from the angle of the wearer; and to determine that the annular wearable device is worn on the left arm of the wearer if the second direction is in a direction pointing to the fingertip, the first rotation direction of the first plane formed by the first direction and the third direction having the second direction as the rotation axis is counter-clockwise when viewed from the angle of the wearer, and the the second rotation direction of the second plane formed by the first direction and the second direction having the third direction as the rotation axis is counter-clockwise when viewed from the angle of the viewer, or if the second direction is in a direction opposing to the fingertip, the first rotation direction of the first plane formed by the first direction and the third direction having the second direction as the rotation axis is clockwise when viewed from the angle of the viewer, and the second rotation direction of the second plane formed by the first direction and the second direction having the third direction as the rotation axis is counter-clockwise when viewed from the angle of the wearer.

Figure 12:
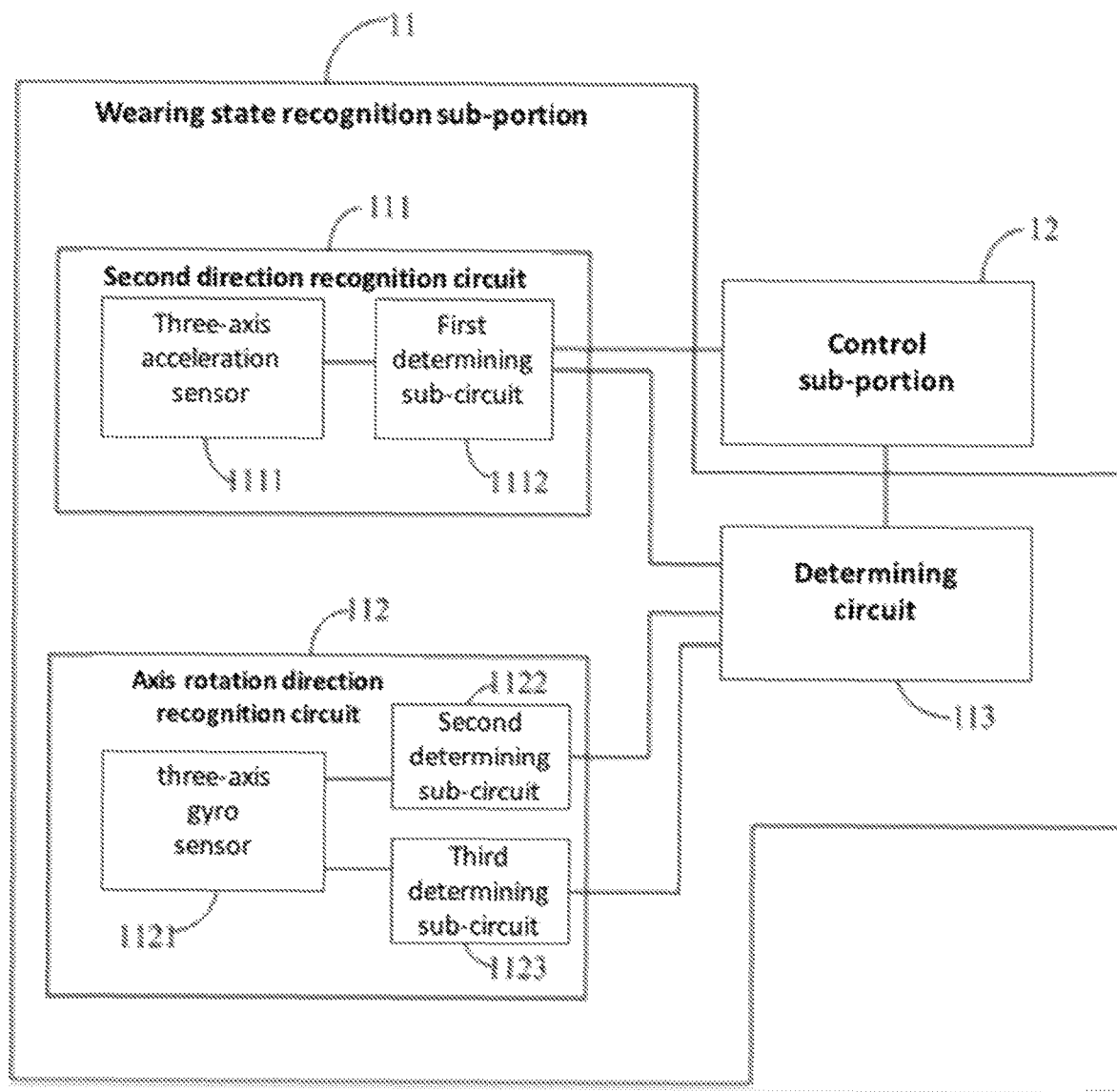
FIG. 12 a schematic diagram illustrating a further detailed structure an operation control portion in the annular wearable device according to some embodiments of the present disclosure.

According to some preferred embodiments of the present disclosure, as shown in FIG. 12, the axis rotation direction recognition circuit 112 in an annular wearable device can comprise a three-axis gyro sensor 1121, a second determining sub-circuit 1122, and a third determining sub-circuit 1123.

The three-axis gyro sensor 1121 is configured to detect a first rotation angle of the first plane formed by the first direction and the third direction having the second direction as the rotation axis upon detecting that the first plane formed by the first direction and the third direction of the annular wearable device is rotating with the second direction as the rotation axis, and to detect a second rotation angle of the second plane formed by the first direction and the second direction having the third direction as the rotation axis upon detecting that the second plane formed by the first direction and the second direction of the annular wearable device is rotating with the third direction as the rotation axis.

The second determining sub-circuit 1122 is configured to determine that the first rotation direction of the first plane formed by the first direction and the third direction having the second direction as the rotation axis is counter-clockwise when viewed from the angle of the wearer if the first rotation angle of the first plane formed by the first direction and the third direction having the second direction as the rotation axis is larger than a first preset positive value, and to determine that the first rotation direction of the first plane formed by the first direction and the third direction having the second direction as the rotation axis is clockwise when viewed from the angle of the wearer if the first rotation angle of the first plane formed by the first direction and the third direction having the second direction as the rotation axis is smaller than a negative value of the first preset positive value.

The third determining sub-unit 1123 is configured to determine that the second rotation direction of the second plane formed by the first direction and the second direction having the third direction as the rotation axis is counter-clockwise when viewed from the angle of the wearer if the second rotation angle of the first plane formed by the first direction and the second direction is larger than a second preset positive value, and to determine that the second rotation direction of the second plane formed by the first direction and the second direction having the third direction as the rotation axis is clockwise when viewed from the angle of the wearer if the second rotation angle of the first plane formed by the first direction and the second direction is smaller than a negative value of the second preset positive value.

According to some preferred embodiments of the present disclosure, as shown in FIG. 12, the second direction recognition circuit 111 can comprise a three-axis acceleration sensor 1111 and a first determining sub-circuit 1112.

The three-axis acceleration sensor 1111 is configured to detect an acceleration value along the second direction upon detecting that the annular wearable device is swinging;

The first determining sub-circuit 1112 is configured to determine that the second direction is in a direction opposing to the fingertip if the acceleration value is positive; and to determine that the second direction is in a direction pointing to the fingertip if the acceleration value is negative.

In a third aspect, the present disclosure further provides a smart control system. The smart control system comprises a terminal, and an annular wearable device.

The annular wearable device is configured to be worn on the arms of the wearer. A direction that is parallel to an extending direction of the annular wearable device and is parallel to a surface of the annular wearable device is a first direction that has been preset. A direction that is perpendicular to the first direction and is parallel to the surface of the annular wearable device is a second direction that has been preset, and a direction of the second direction that is opposing to the annular wearable device is a fixed direction. A direction that is perpendicular to the surface of the annular wearable device is a third direction that has been preset.

The annular wearable device is configured to control an operation of the terminal by detecting a relative positional change between the first direction, the second direction, and the third direction.

The smart control system as described above can control the operation of the terminal by detecting the movements of the wearer when the annular wearable device is worn on the arms of the wearer. For example, it can be configured to control the terminal to start when raising a left hand, to shut down when raising a right hand, to slide to the left when waving the left hand, and to slide to the right when waving the right hand, etc.

As such, the control function can be diversified. Compared with simple gesture control, because of the addition of separate controls by the left hand and the right hand, more operations can thus be controlled by gestures, thereby relatively simple movements can realize multiple functional control, and there is no need to design complicated gestures.

According to some embodiments of the smart control system as described above, the manner in which the annular wearable device is configured to control the terminal by detecting relative positional change between the first direction, the second direction and the third direction can comprise:

determining weather the annular wearable device is worn on a left arm or a right arm of a wearer by detecting a relative positional change between the first direction, the second direction, and the third direction; and controlling an operation of the terminal based on at least whether the annular wearable device is worn on the left arm or the right arm of the wearer.

Depending on different embodiments, the terminal can be a smart phone, a smart watch, or a smart display panel, etc. There are no limitations herein.

It should be noted that in the smart control system as described above, the working principles of determining whether the annular wearable device is worn on the left arm or right arm of the wearer by detecting the relative positional change between the first direction, the second direction, and the third direction is substantially identical to that as described above in the aforementioned embodiments, and the detailed description is skipped herein.

The method for controlling an annular wearable device, the annular wearable device, and the smart control system as provided by the present disclosure can control the operation of the annular wearable device by detecting the relative positional change between the first direction, the second direction, and the third direction. For example, it can be configured to control to start by raising a left hand, to shut down by raising a right hand, to slide to the left by waving the left hand, and to slide to the right by waving the right hand, etc. As such controlling by means of an operation interface is no longer needed, and the operation control can be realized based on certain movements of the wearer, therefore it is more convenient to use.

In the description of the present disclosure, numerous specific details are described. However, it can be understood that the embodiments of the present disclosure may be implemented without these specific details. In some embodiments, well-known methods, structures and techniques are not described in details, so as not to obscure the comprehension to this description.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for controlling an annular wearable device worn by surrounding an arm of a wearer, comprising:
    providing the annular wearable device, the annular wearable device having a display, an operation control portion, and an attachment means configured to affix the annular wearable device around the arm of the wearer;
    determining whether the annular wearable device is worn on a left arm or a right arm of the wearer based on a relative positional change in a three-dimensional space consisting of a first direction, a second direction, and a third direction, wherein:
        the first direction resides along a first axis which is parallel to an extending direction of the annular wearable device and is parallel to a tangent line of a curved surface of the annular wearable device, the display being provided in a plane parallel to the tangent line;
        the second direction resides along a second axis which is perpendicular to the first direction and is parallel to a longitudinal axis of the annular wearable device; and
        the third direction resides along a third axis which is perpendicular to both of the first and the second direction extending radially outward from the curved surface; and
    wherein said step of determining whether the annular wearable device is worn on a left arm or a right arm comprises:
        detecting an acceleration value along the second direction when the wearer is swing the arm with the annular wearable device, and
        determining a pointing direction of the second direction wherein
            if the acceleration value is positive, a direction being defined as being opposing to a fingertip of the wearer is determined, or
            if the acceleration value is negative, a direction being defined as pointing to the fingertip of the wearer is determined;
        determining a first rotation direction of a first plane formed by the first direction and the third direction having the second direction as a rotation axis upon detecting that the first plane is rotating around the second direction, and a second rotation direction of a second plane formed by the first direction and the second direction having the third direction as a rotation axis upon detecting that the second plane is rotating around the third direction; and
        determining whether the annular wearable device is worn on the left arm or the right arm of the wearer based on the pointing direction of the second direction, the first rotation direction of the first plane, and the second rotation direction of the second plane;
    wherein the determining a first rotation direction of a first plane formed by the first direction and the third direction having the second direction as a rotation axis upon detecting that the first plane is rotating around the second direction, and a second rotation direction of a second plane formed by the first direction and the second direction having the third direction as a rotation axis upon detecting that the second plane is rotating around the third direction comprises:

detecting a first rotation angle of the first plane and a second rotation angle of the second plane; and
determining that:
the first rotation direction of the first plane is counter-clockwise relative to the display when viewed from the third direction responsive to that the first rotation angle is larger than a first preset positive value, or clockwise relative to the display when viewed from the third direction responsive to that the first rotation angle is smaller than a negative value of the first preset positive value; and
the second rotation direction of the second plane is counter-clockwise relative to the display when viewed from the third direction responsive to that the second rotation angle is larger than a second preset positive value, or clockwise relative to the display when viewed from the third direction responsive to that the second rotation angle is smaller than a negative value of the second preset positive value;
determining a desired display orientation aligned with the first direction, wherein the determination of the display orientation is made based on a comparison between a rotation about the first rotation direction and the second rotation direction;
reorienting the desired display orientation to be arranged in a positive or negative direction along the first direction in accordance with the determination of the desired display orientation.

2. The method of claim 1, the determining a wearing state of the annular wearable device based on a positional change thereof comprises:
determining the wearing state of the annular wearable device based on a relative positional change in a three-dimensional space consisting of a first direction, a second direction, and a third direction, wherein:
the first direction is parallel to an extending direction of the annular wearable device and is parallel to a surface of the annular wearable device;
the second direction is perpendicular to the first direction and is parallel to the surface of the annular wearable device; and
the third direction is perpendicular to the surface of the annular wearable device.

3. The method of claim 2, wherein the first direction is along a tangent line of a display panel of the annular wearable device.

4. The method of claim 1, wherein at least one of the first rotation direction of the first plane and the second rotation direction of the second plane is detected by a three-axis gyro sensor.

5. The method of claim 1, wherein the determining whether the annular wearable device is worn on the left arm or the right arm of the wearer based on the pointing direction of the second direction, the first rotation direction of the first plane, and the second rotation direction of the second plane comprises:
responsive to that the third direction is in a direction opposing to the wearer, determining:
that the annular wearable device is worn on the right arm of the wearer, responsive to that the second direction is in the direction pointing to the fingertip, the first rotation direction is clockwise relative to the display when viewed from the third direction, and the second rotation direction is counter-clockwise relative to the display when viewed from the third direction, or responsive to that the second direction is in the direction opposing to the fingertip, the first rotation direction is counter-clockwise relative to the display when viewed from the third direction, and the second rotation direction is counter-clockwise relative to the display when viewed from the third direction; or
that the annular wearable device is worn on the left arm of the wearer, responsive to that the second direction is in the direction pointing to the fingertip, the first rotation direction is counter-clockwise relative to the display when viewed from the third direction, and the second rotation direction is clockwise relative to the display when viewed from the third direction, or responsive to that the second direction is in the direction opposing to the fingertip, the first rotation direction is clockwise relative to the display when viewed from the third direction, and the second rotation direction is clockwise relative to the display when viewed from the third direction;
or responsive to that the third direction is in a direction pointing to the wearer, determining:
that the annular wearable device is worn on the right arm of the wearer, responsive to that the second direction is in the direction pointing to the fingertip, the first rotation direction is clockwise relative to the display when viewed from the third direction, and the second rotation direction is clockwise relative to the display when viewed from the third direction, or responsive to that the second direction is in the direction opposing to the fingertip, the first rotation direction is counter-clockwise relative to the display when viewed from the third direction and the second rotation direction is clockwise relative to the display when viewed from the third direction; or
that the annular wearable device is worn on the left arm of the wearer, responsive to that the second direction is in the direction pointing to the fingertip, the first rotation direction is counter-clockwise relative to the display when viewed from the third direction, and the second rotation direction is counter-clockwise relative to the display when viewed from the third direction, or responsive to that the second direction is in the direction opposing to the fingertip, the first rotation direction is clockwise relative to the display when viewed from the third direction, and the second rotation direction is counter-clockwise relative to the display when viewed from the third direction.

6. The method of claim 5, wherein the determining whether the wearable device is worn on the left arm or the right arm of the wearer based on the pointing direction of the second direction, the first rotation direction of the first plane, and the second rotation direction of the second plane comprises:
determining that the annular wearable device is worn:
on the right arm of the wearer responsive to that $Z_{xy}=1$ and $Y_0 \times Y_{xz}=-1$; or $Z_{xy}=-1$ and $Y_0 \times Y_{xz}=-1$;
or on the left arm of the wearer responsive to that $Z_{xy}=-1$ and $Y_0 \times Y_{xz}=1$; or $Z_{xy}=1$ and $Y_0 \times Y_{xz}=1$;
wherein:
the second direction $Y_0$ equals to 1 when in a direction pointing to the fingertip, or to −1 when in a direction opposing to the fingertip;
the first rotation direction of the first plane Yxz equals to −1 when clockwise relative to the display when viewed from the third direction or to 1 when counter-clockwise relative to the display when viewed from the third direction; and the second rotation direction Zxy equals to −1 when clockwise relative to the display when viewed from the third direction or to 1 when counterclockwise relative to the display when viewed from the third direction.

7. The method of claim 1, further comprising:

adjusting a display direction of a display panel of the annular wearable device according to the wearing state of the annular wearable device.

\* \* \* \* \*